(12) United States Patent
Brick

(10) Patent No.: US 11,372,148 B2
(45) Date of Patent: Jun. 28, 2022

(54) LIGHT FIBER AND ILLUMINATING DEVICE

(71) Applicant: OSRAM OLED GmbH, Regensburg (DE)

(72) Inventor: Peter Brick, Regensburg (DE)

(73) Assignee: OSRAM OLED GMBH, Regensburg (DE)

( * ) Notice: Subject to any disclaimer, the term of this patent is extended or adjusted under 35 U.S.C. 154(b) by 0 days.

(21) Appl. No.: 16/973,390

(22) PCT Filed: Jun. 14, 2019

(86) PCT No.: PCT/EP2019/065734
§ 371 (c)(1),
(2) Date: Dec. 8, 2020

(87) PCT Pub. No.: WO2019/238945
PCT Pub. Date: Dec. 19, 2019

(65) Prior Publication Data
US 2021/0199872 A1   Jul. 1, 2021

(30) Foreign Application Priority Data

Jun. 15, 2018  (DE) .......................... 102018114420.2

(51) Int. Cl.
| | |
|---|---|
| *F21V 8/00* | (2006.01) |
| *G02B 6/02* | (2006.01) |
| *F21K 9/61* | (2016.01) |
| *F21Y 113/13* | (2016.01) |

(52) U.S. Cl.
CPC .............. *G02B 6/0006* (2013.01); *F21K 9/61* (2016.08); *G02B 6/001* (2013.01); *G02B 6/0008* (2013.01);
(Continued)

(58) Field of Classification Search
CPC .. G02B 6/0006; G02B 6/0068; G02B 6/0008; G02B 6/02; G02B 6/0005;
(Continued)

(56) References Cited

U.S. PATENT DOCUMENTS

| | | | |
|---|---|---|---|
| 6,061,491 A | 5/2000 | Leitel | |
| 6,169,836 B1 * | 1/2001 | Sugiyama | .............. G02B 1/046 362/552 |

(Continued)

FOREIGN PATENT DOCUMENTS

| | | |
|---|---|---|
| DE | 19708420 A1 | 9/1998 |
| JP | 2013214408 A | 10/2013 |

(Continued)

*Primary Examiner* — Erin Kryukova
(74) *Attorney, Agent, or Firm* — Slater Matsil, LLP

(57) ABSTRACT

A light fiber and an illuminating device are disclosed. In an embodiment a light fiber includes a cladding and at least two cores configured to conduct electromagnetic radiation, wherein each core comprises an incoupling surface at one end of the light fiber, wherein the incoupling surfaces of different cores are not contiguous, wherein each of the cladding and/or the cores includes at least one outcoupling zone configured to outcouple the electromagnetic radiation from the cores, wherein the light fiber is configured to emit at least a majority of the electromagnetic radiation in a region of outcoupling zone transverse to a main extension direction of the light fiber, wherein the cores are configured to guide primary radiation, and wherein the outcoupling zone is configured to mix the primary radiation so that mixed light is emitted from the light fiber.

15 Claims, 5 Drawing Sheets

(52) U.S. Cl.
CPC ....... *G02B 6/0068* (2013.01); *G02B 6/02042* (2013.01); *F21Y 2113/13* (2016.08)

(58) Field of Classification Search
CPC .......................... G02B 6/02042; G02B 6/001; G02B 6/02052; F21Y 2113/10; F21Y 2113/13; F21Y 2105/10; F21Y 2105/12; F21Y 2105/14; F21Y 2105/16; F21Y 2105/18; F21Y 2103/10; F21V 7/0091; F21K 9/61; F21K 9/62
See application file for complete search history.

(56) References Cited

U.S. PATENT DOCUMENTS

| | | | | |
|---|---|---|---|---|
| 6,584,714 | B1* | 7/2003 | Wehrmann | G02B 6/0003 40/546 |
| 2004/0213020 | A1 | 10/2004 | Gotfried | |
| 2006/0291203 | A1 | 12/2006 | Anandan | |
| 2007/0206375 | A1* | 9/2007 | Piepgras | A43B 1/0027 362/147 |
| 2010/0066254 | A1* | 3/2010 | Ott | G02B 6/001 315/129 |
| 2011/0176776 | A1 | 7/2011 | Imamura | |
| 2012/0128296 | A1 | 5/2012 | Katayama et al. | |
| 2015/0277034 | A1* | 10/2015 | Nagura | G02B 6/001 362/556 |
| 2018/0231712 | A1* | 8/2018 | Pare | G01J 3/0218 |
| 2019/0170949 | A1* | 6/2019 | Collier | G02B 6/02 |

FOREIGN PATENT DOCUMENTS

| | | | | |
|---|---|---|---|---|
| WO | | 0157435 A1 | 8/2001 | |
| WO | WO-2012169248 A1 * | | 12/2012 | ............. H05B 45/22 |

* cited by examiner

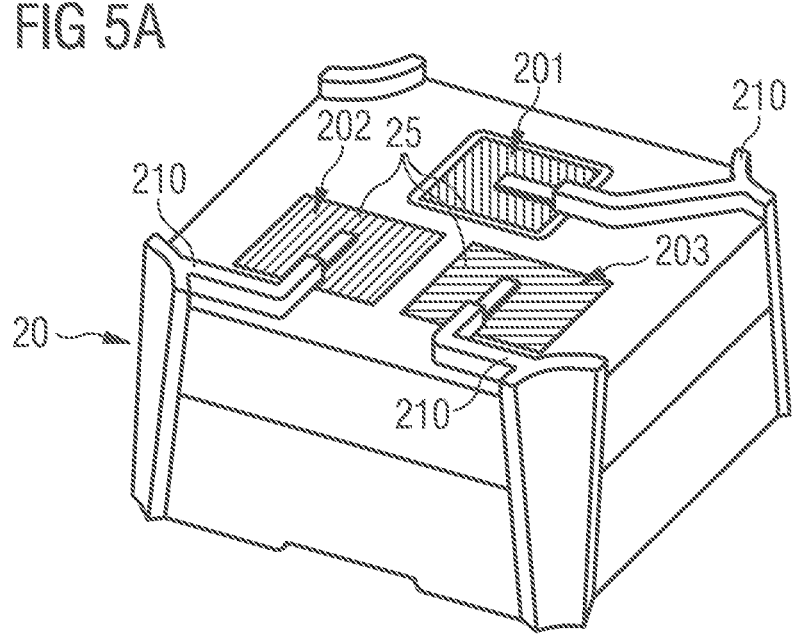
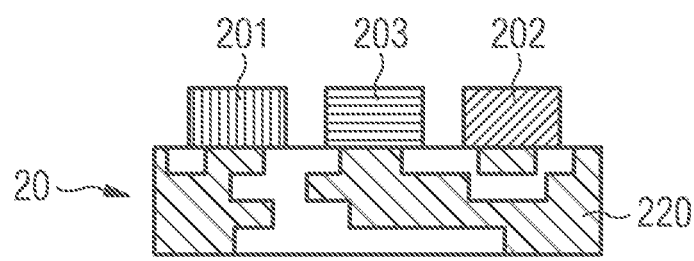
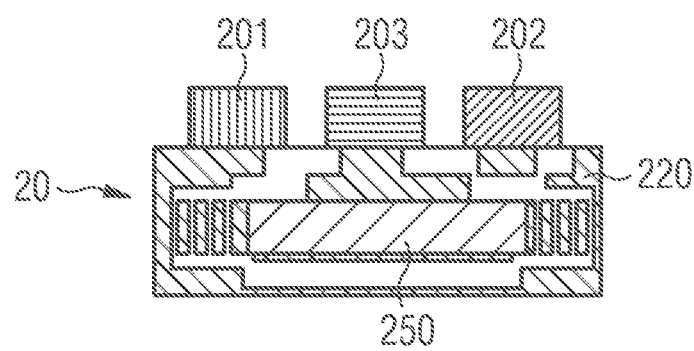

LIGHT FIBER AND ILLUMINATING DEVICE

This patent application is a national phase filing under section 371 of PCT/EP2019/065734, filed Jun. 14, 2019, which claims the priority of German patent application 102018114420.2, filed Jun. 15, 2018, each of which is incorporated herein by reference in its entirety.

TECHNICAL FIELD

A light fiber is specified. Furthermore, an illumination device is specified.

SUMMARY

Embodiments provide a light fiber with improved reliability and optical properties. Further embodiments provide an illumination device with improved reliability and optical properties.

The light fiber comprises a cladding and at least two cores for conducting electromagnetic radiation, wherein the cores each comprise an incoupling surface at one end of the light fiber. The incoupling surfaces of different cores are not contiguous. The light fiber is configured to guide electromagnetic radiation in the visible wavelength range. The cores and the cladding are made of a material that is transparent to electromagnetic radiation.

The light fiber comprises a main extension direction along which the cores extend in the light fiber. Perpendicular to the main extension direction of the light fiber, the cores are completely surrounded by the cladding. The cores are used to guide the electromagnetic radiation. At an interface between the cores and the cladding, the electromagnetic radiation is reflected so that the electromagnetic radiation is guided along the main extension direction of the cores.

The cladding and the cores comprise, for example, a dielectric material. The dielectric material is non-metallic and non-conductive. In particular, the dielectric material does not contain any metallic components. The material of the cores and the cladding differs in its refractive index. In particular, the cores have a higher refractive index than the cladding. In particular, the relative difference in refractive indices between the cores and the cladding is at least 1%, preferably at least 2%. The different refractive indices may be obtained by different doping of the cladding and core materials.

A light fiber described here may be part of an illumination device, where electromagnetic radiation in the form of primary radiation from different emission regions is coupled into the cores. The emission regions may be part of one or more LED or laser chip(s). The primary radiation is then mixed in the light fiber and emitted as mixed light in outcoupling zones of the light fiber.

The light fiber described here is based, inter alia, on the consideration that the incoupling of primary radiation of several emission regions into a common light fiber with a single core requires special treatments. For example, if the incoupling surface of the single core is wrongly positioned relative to the emission regions, the portion of the coupled primary radiation of one emission region is increased, while the portion of the incoupled primary radiation of another emission region is reduced. Thus even a slight misalignment of the incoupling surface leads to a significant change of the ratio of the incoupled primary radiation.

The light fiber described here makes use of the idea of arranging several cores in the light fiber. Thus, an individual core, in particular the incoupling surface of the core, may be arranged downstream of each emission region in its respective radiation direction. If the end of the light fiber into which the primary radiation is coupled is incorrectly positioned, the incoupling of all primary radiation into the cores is ideally changed uniformly. Thus, the ratio of the incoupled primary radiations of the different emission regions remains essentially the same.

Advantageously, the use of several cores in a common light fiber enables a particularly reliable coupling of several primary radiations and thus a particularly reliable conduction and emission of electromagnetic radiation.

According to one embodiment, the cross-section of the light fiber is not rotationally symmetrical perpendicular to the main extension direction of the light fiber. For example, the light fiber has an oval cross-section. Alternatively, the light fiber has a square, especially a rectangular cross-section.

In particular, the non-rotationally symmetric cross-section of the light fiber serves as a torsion protection. The non-rotationally symmetric cross-section is used to define the position of the incoupling surfaces relative to a light-emitting component. In particular, a rotation of the light fiber around an axis perpendicular to the incoupling surfaces, which is disadvantageous for the incoupling, is prevented. Advantageously, the non-rotationally symmetric cross-section simplifies a precise alignment of the light fiber relative to emission regions.

According to one embodiment, the respective incoupling surface of the cores is not rotationally symmetrical. In particular, the respective cross-section of the cores perpendicular to the main extension direction of the cores is not rotationally symmetrical. The incoupling surfaces and/or the cross-sections of the cores have, for example, an oval or polygonal, in particular rectangular, shape.

The shape of the incoupling surfaces of the cores is adapted to the shape of the emission regions whose primary radiation is to be coupled into the cores. For example, the cross-section of the beam cone perpendicular to the radiation direction of the primary radiation is mathematically similar to the incoupling surface into which the primary radiation is incoupled. It is advantageous that the primary radiation is incoupled with particularly high efficiency into the cores of the light fiber.

According to one embodiment, the cores are helically twisted along the main extension direction of the light fiber. For example, the cores have a common axis around which the cores rotate along the main extension direction of the light fiber. For example, the common axis runs along the main extension direction of the light fiber at the geometric center of gravity of the cross-section of the light fiber.

According to an embodiment, the incoupling surfaces are arranged at a distance from each other. For example, the distance between the incoupling surfaces is at least 40 µm, preferably at least 100 µm.

For example, the distance of the incoupling surfaces also determines the distance of the emission regions perpendicular to their radiation direction. Thus, by means of an increased distance of the incoupling surfaces, increased distances between individual emission regions are possible. Advantageously increasing the distance of the emission regions to each other to simplify the dissipation of heat generated during operation of the emission regions.

In particular, the cores are arranged perpendicular to the main extension direction of the light fiber at a distance from each other. The distance may decrease from the incoupling surfaces along the main extension direction of the light fiber.

In particular, the cores may converge to a common core along the main extension direction so that the distance along the main extension direction of the light fiber is reduced to zero.

According to one embodiment, the cladding and/or the cores each comprise at least one outcoupling zone for outcoupling electromagnetic radiation from the cores. The light fiber is configured to emit at least a majority of the electromagnetic radiation in the region of the outcoupling zone transverse to the main extension direction of the light fiber.

For example, the cores, the cladding or the interfaces between cores and cladding comprise scattering centers in the outcoupling zone. The scattering centers may be formed by scattering particles or by roughening of surfaces. Electromagnetic radiation is scattered at the scattering centers so that the angle of total reflection at the interface between the cores and the cladding is undercut and at least a part of the electromagnetic radiation escapes through the cladding. Alternatively or additionally, the cores may be more strongly curved in the regions of the outcoupling zone, so that total internal reflection of the electromagnetic radiation taking place at the interface between the cores and the cladding is reduced. In particular, the curvature of the fiber cores in the outcoupling zone may increase along the light propagation direction so that a homogeneous light output is achieved. According to another alternative, the cladding may be partially removed or otherwise modified in the outcoupling zone so that at least a part of the electromagnetic radiation guided in the light fiber is outcoupled in the outcoupling zone.

In particular, the primary radiations, which are guided in different cores, are mixed in the light fiber in the outcoupling zone, so that mixed light is emitted by the light fiber. The mixing of the primary radiation may take place within one core. Alternatively or additionally the mixing of the primary radiation may take place in the cladding.

For example, the cladding and/or the cores comprise a plurality of outcoupling zones. In particular the outcoupling zones are not formed contiguously. For example, light guided in different cores is mixed in the region of the outcoupling zones.

Furthermore, an illumination device is specified. The illumination device includes in particular a light fiber described here. This means that all features disclosed for the light fiber are also disclosed for the illumination device and vice versa.

The illumination device comprises a light-emitting component with at least two emission regions and a light fiber described here. The light-emitting component is configured to generate and emit primary radiation in at least two emission regions.

The emission regions are configured to emit the primary radiation in the radiation direction. The emission regions are each followed by an incoupling surface of the cores of the light fiber in the radiation direction. During normal operation, a majority, in particular at least 70%, of the primary radiation emitted by the emission regions each hits one of the incoupling surfaces and is coupled into one of the cores. In particular, the number of incoupling surfaces is as large as the number of emission region. For example, each emission region is uniquely assigned to one incoupling surface.

The emission regions are arranged overlapping with one of the incoupling surfaces, seen along the radiation direction. For example, at least 70%, preferably at least 80%, of each emission region overlaps with one of the incoupling surfaces. In particular, the overlap of the individual emission regions with one of the incoupling surfaces differs among themselves by a maximum of 10%, preferably by a maximum of 5%. For example, the numerical aperture (NA) of the fiber is at least 0.3.

According to one embodiment, the light-emitting component comprises at least one surface-mountable semiconductor chip or at least one planar-contacted semiconductor chip. For example, the emission regions are part of a common semiconductor chip or are alternatively formed by different semiconductor chips. In particular, the semiconductor chip is not contacted by a bonding wire.

In this context, surface-mountable means that the semiconductor chip can only be contacted and operated via a side that faces away from the light guide. Planar-contacted in this context means that the semiconductor chip can be contacted electrically conductively on a side facing the light guide by means of flat contact structures. In particular, the planar contact structures are not bonding wires that protrude beyond the semiconductor chip on a side facing the light guide.

The emission regions may be arranged advantageously very close to the incoupling surfaces. For example, there is a gap between the emission regions and the light fiber, which is filled with a transparent medium such as air. Along the radiation direction, the gap width of the gap is, for example, a maximum of 500 µm, preferably a maximum of 100 µm. There is no direct contact between the light fiber and the emission regions, so that a heating of the light fiber during operation of the optoelectronic component is avoided. However, the small gap width allows a particularly efficient incoupling of the primary radiation into the light fiber.

According to one embodiment, the incoupling surfaces each comprise a first geometric center of gravity and the emission regions each comprise a second geometric center of gravity. Along the radiation direction, the first geometric centers of gravity are congruent with one of the second geometric centers of gravity. For example, an offset of a first geometric center of gravity to a second geometric center of gravity perpendicular to the radiation direction is a maximum of 200 µm, in particular a maximum of 100 µm. Advantageously a particularly large portion of the emitted primary radiation of an emission region is thus coupled into the core assigned to the emission region.

According to one embodiment, the emission regions are configured to emit primary radiation in different wavelength ranges. For example, the illumination device comprises one emission region each which is configured to emit electromagnetic radiation in a red, a green and a blue wavelength range.

In particular the emission regions, which are configured to emit primary radiation in different wavelength ranges, have a different size perpendicular to the radiation direction. For example, the emission regions are Lambertian emitters, each of which has an area of at least 200 µm×200 µm. In particular, the emission regions are of different sizes. For example, the emission region, which is configured to emit electromagnetic radiation in the green wavelength range, is larger than the emission regions, which are configured to emit electromagnetic radiation in the red or blue wavelength range.

According to one embodiment, electromagnetic radiation emitted in the outcoupling zone is mixed light, which comprises the primary radiation from all emission regions, in particular consists if the primary radiation. For example, the primary radiations are coupled into separate cores of the light fiber by separate incoupling surfaces. The cores may converge to a common core along the main extension direction of the light fiber so that the primary radiation is mixed in the common core. Alternatively or additionally, scattering centers may be arranged in the outcoupling zone where the primary radiation is scattered and thus mixed.

BRIEF DESCRIPTION OF THE DRAWINGS

Advantageous embodiments and developments of the light fiber and the illumination device will become apparent from the exemplary embodiments described below in association with the figures.

FIGS. 5A, 5B and 5C show schematic views of exemplary embodiments of light-emitting components of illumination devices.

In the exemplary embodiments and figures, similar or similarly acting constituent parts are provided with the same reference symbols. The elements illustrated in the figures and their size relationships among one another should not be regarded as true to scale. Rather, individual elements may be represented with an exaggerated size for the sake of better representability and/or for the sake of better understanding.

DETAILED DESCRIPTION OF ILLUSTRATIVE EMBODIMENTS

Figure 1A:
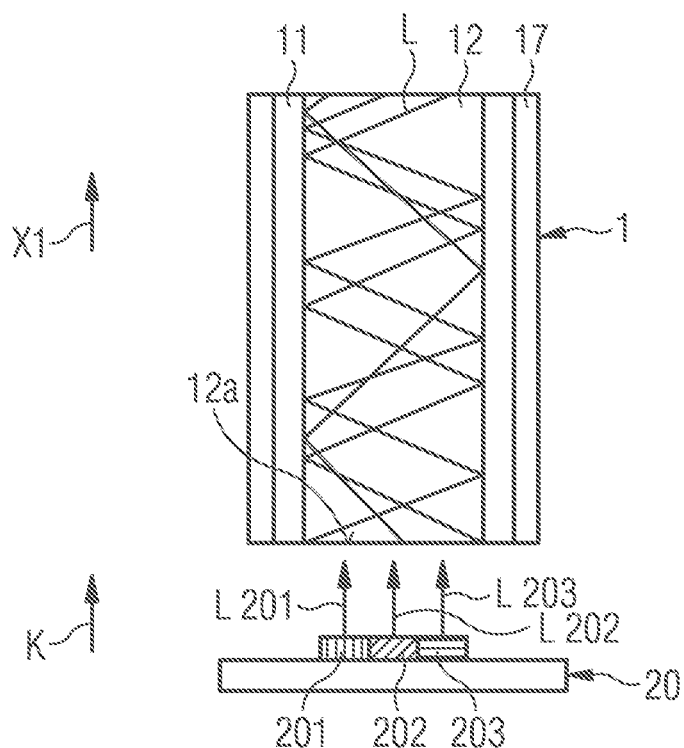
FIGS. 1A and 1B show schematic representations of exemplary embodiments of a illumination device with a conventional light fiber.

FIG. 1A shows a schematic sectional view of an illumination device 2 with a conventional light fiber 1 according to an exemplary embodiment. The illumination device 2 comprises a light-emitting component 20 with a first 201, a second 202, and a third 203 emission region, each configured to emit primary radiation L201, L202, and L203 along a radiation direction K. The primary radiation L201 of the first emission region 201 is, for example, electromagnetic radiation in the green wavelength range. The primary radiation L202 of the second emission region 202 is, for example, electromagnetic radiation in the red wavelength range. The primary radiation L203 of the third emission region 203 is, for example, electromagnetic radiation in the blue wavelength range.

In the radiation direction K, the light fiber 1 is subordinated to the light-emitting component 20. The light fiber 1 comprises a core 12, a cladding 11 and an absorber 17. The light fiber 1 comprises a main extension direction X1. Perpendicular to the main extension direction X1, the core 12 is completely surrounded by the cladding 11 and the cladding 11 is completely surrounded by the absorber 17.

The core 12 and the cladding 11 are formed with a material that is transparent for the primary radiations L201, L202, L203. For example, the material of the core 12 and the cladding 11 comprises a glass or a polymer. The material of the core 12 differs from the material of the cladding 11 in its refractive index. For example, the refractive index of the material of core 12 is at least 1% higher than the refractive index of the material of cladding 11.

The absorber 17 is formed with a material that absorbs the primary radiations L201, L202, L203. For example, the material of the absorber 17 comprises a polymer.

Figure 1B:
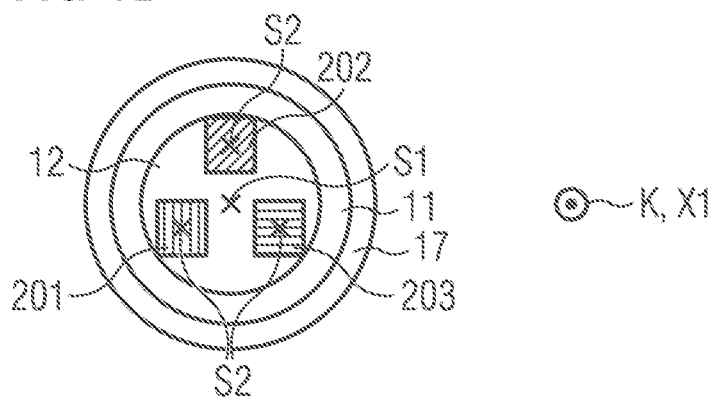

FIG. 1B shows an alternative perspective of the exemplary embodiment shown in FIG. 1A. FIG. 1B shows a schematic plan view of the emission regions 201, 202, 203 against the radiation direction K and the arrangement of the emission regions 201, 202, 203 relative to light fiber 1.

The core 12 comprises an incoupling surface 12a, through which the primary radiation L201, L202, L203 of the emission regions 201, 202, 203 is coupled into the light fiber 1. In light fiber 1, the primary radiations L201, L203, L203 are mixed to mixed light L.

The incoupling surface 12a comprises a first geometric center of gravity and the emission regions 201, 202, 203 each comprise a second geometric center of gravity S2. Viewed along the radiation direction K, the second geometric centers of gravity S2 are not congruent with the first geometric center of gravity S1, but comprise an offset.

In case of a faulty alignment of the light fiber 1 to the light-emitting component 2, the offset of the second geometric center of gravity S2 to the first geometric center of gravity S1 changes in different ways. Thus, the share of the incoupled primary radiation L201, L202, L203 of the individual emission regions 201, 202, 203 changes in different ways. Consequently, if the alignment is incorrect, the composition of the mixed light L from the primary radiations L201, L202, L203 is also changed, so that the color coordinates of the mixed light are changed.

Figure 2A:
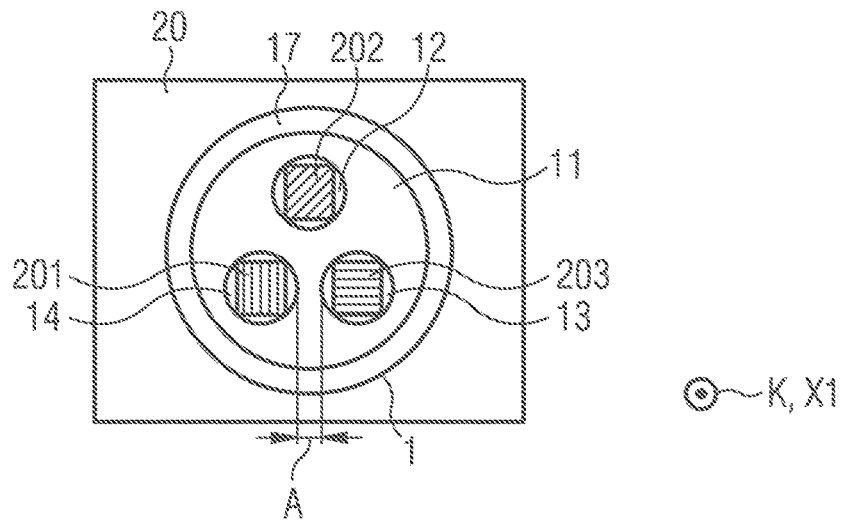
FIGS. 2A, 2B, and 2C show schematic plan views of incoupling surfaces of a light fiber and emission regions according to an exemplary embodiment of an illumination device.

FIG. 2A shows in a schematic plan view of the emission regions 201, 202, 203 against the radiation direction K the arrangement of the emission regions 201, 202, 203 relative to light fiber 1 according to an alternative exemplary embodiment. The illumination device 2 comprises a light-emitting component 20 with three emission regions 201, 202, 203 and a light fiber 1.

Light fiber 1 comprises a cladding 11 and three cores 12, 13, 14 for conducting electromagnetic radiation, in particular primary radiation L201, L202, L203. The cores 12, 13, 14 each comprise at one end of the light fiber 1 an incoupling surface 12a, 13a, 14a through which the primary radiation L201, L202, L203 is coupled into the cores 12, 13, 14 during operation.

The incoupling surfaces are circular and each comprises a diameter of at least 150 µm, preferably at least 250 µm. The cross-section of the light fiber comprises a maximum diameter of 1 mm. Advantageously, such a light fiber may be arranged with a bending radius of less than 10 mm. The cores 12, 13, 14 are arranged perpendicular to the main extension direction X1 of the light fiber 1 at a distance A from each other. The distance A is at least 40 µm.

Figure 2B:
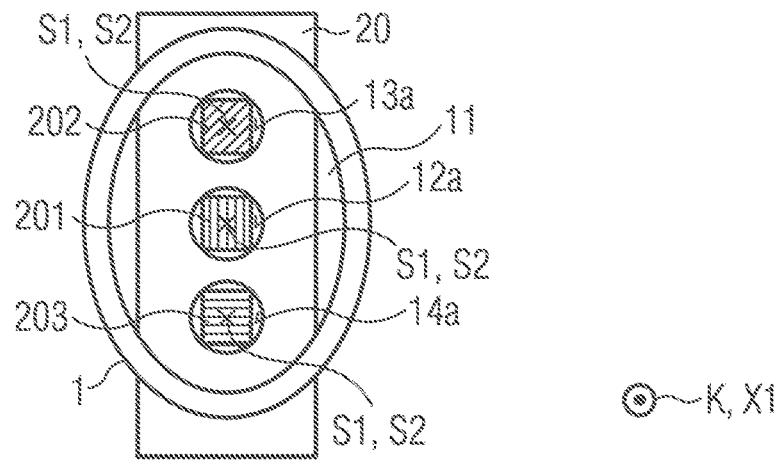

FIG. 2B shows in a schematic plan view of the emission regions 201, 202, 203 against the radiation direction K the arrangement of the emission regions 201, 202, 203 relative to the light fiber 1 according to an alternative exemplary embodiment. In contrast to the exemplary embodiment shown in FIG. 2A, the cross-section of the light fiber 1 perpendicular to the main extension direction X1 of the light fiber 1 is not rotationally symmetric. In this example, the cross-section of the light fiber 1 is not round but oval. Advantageously, the non-rotationally symmetric shape of the cross-section of the light fiber 1 simplifies the alignment of the light fiber 1 relative to the light-emitting component 20.

The incoupling surfaces 12a, 13a, 14a of the cores 12, 13, 14 each comprise a first geometrical center of gravity S1. The emission regions 201, 202, 203 each comprise a second geometric center of gravity. In the exemplary embodiment shown in FIG. 2B, each first geometric center of gravity S1 is congruent with a second geometric center of gravity S2 when viewed along the radiation direction K.

Figure 2C:
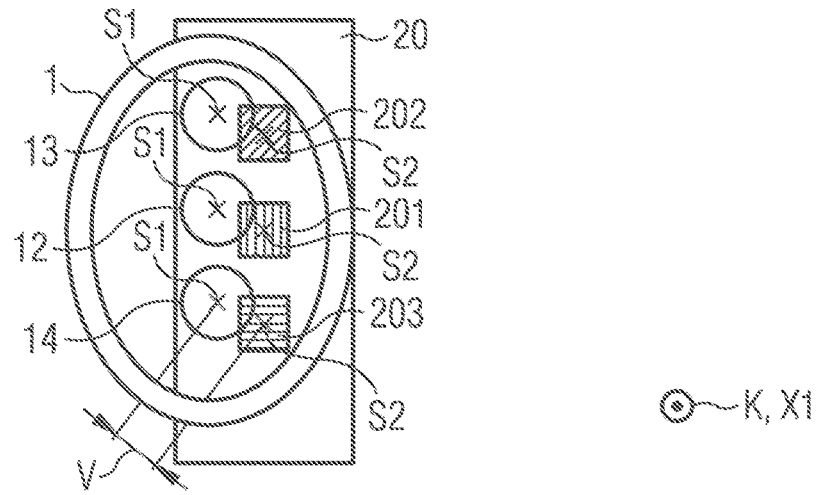

FIG. 2C shows in a schematic plan view of the emission regions 201, 202, 203 against the radiation direction K the arrangement of the emission regions 201, 202, 203 relative to the light fiber 1 according to an alternative exemplary embodiment. In contrast to the exemplary embodiment shown in FIG. 2B, the first geometric centers of gravity S1 are not congruent with a second geometric center of gravity S2. Instead, the first geometric centers of gravity S1 each comprise an offset V to the second geometric centers of gravity S2. The offset V of each second geometric center of gravity S2 to the respectively assigned first geometric center of gravity S1 is essentially identical. For example, the offset V of the first geometric centers of gravity S1 to the respectively assigned second geometric centers of gravity S2 differs by a maximum of 5%.

Figure 3A:
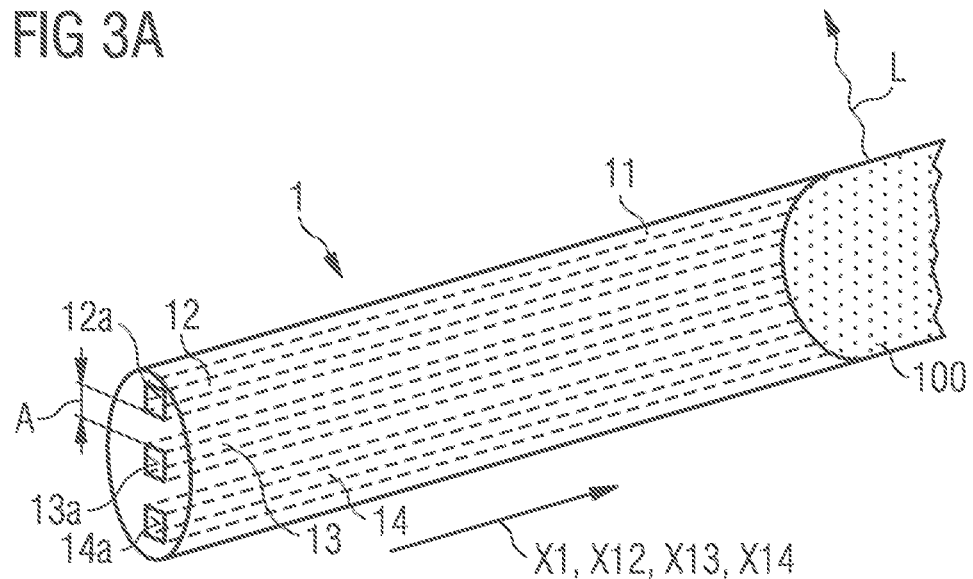
FIGS. 3A, 3B, 3C and 3D show schematic spatial representations of different exemplary embodiments of light fibers.

FIG. 3A shows schematic spatial representations of an exemplary embodiment of a light fiber 1. The light fiber 1 which comprises three cores 12, 13, 14, whose main extension directions X12, X13, X14 are along the main extension direction X1 of the light fiber. Perpendicular to their main extension direction X12, X13, X14, the cores 12, 13, 14 are each completely surrounded by the cladding 11.

The cores 12, 13, 14 each comprise an incoupling surface 12a, 13a, 14a. The incoupling surfaces 12a, 13a, 14a are arranged at a distance A from each other. The incoupling surfaces 12a, 13a, 14a are each not rotationally symmetrical. Instead, the incoupling surfaces 12a, 13a, 14a each comprise a rectangular shape.

The cladding 11 comprises at least one outcoupling zone 100 for coupling out electromagnetic radiation, in particular mixed light L. The cladding 11 comprises scattering centers in the outcoupling zone 100, which are configured to scatter primary radiation L201, L202, L203 and thus to couple out through the cladding 11 transversely to the main extension direction X1 of the light fiber 1.

Figure 3B:
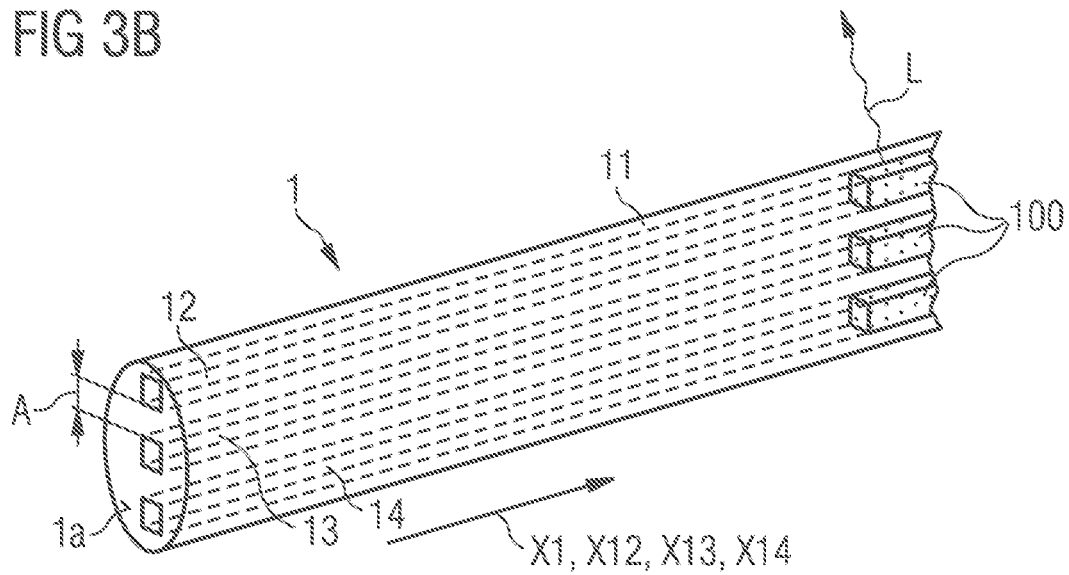

FIG. 3B shows schematic spatial representations of another exemplary embodiment of a light fiber 1. In contrast to the exemplary embodiment shown in FIG. 3A, the outcoupling zone 100 is formed in the cores 12, 13, 14 or at the interface between the cores 12, 13, 14 and the cladding 11. For example, in the outcoupling zone 100 scattering centers are formed in the form of scattering particles or a roughened interface between cores 12, 13, 14 and cladding 11.

In particular, the cores 12, 13, 14 comprise a plurality of outcoupling zones 100 which are not formed contiguous. Preferably, light guided in different cores is mixed in the region of the outcoupling zones 100.

Figure 3C:
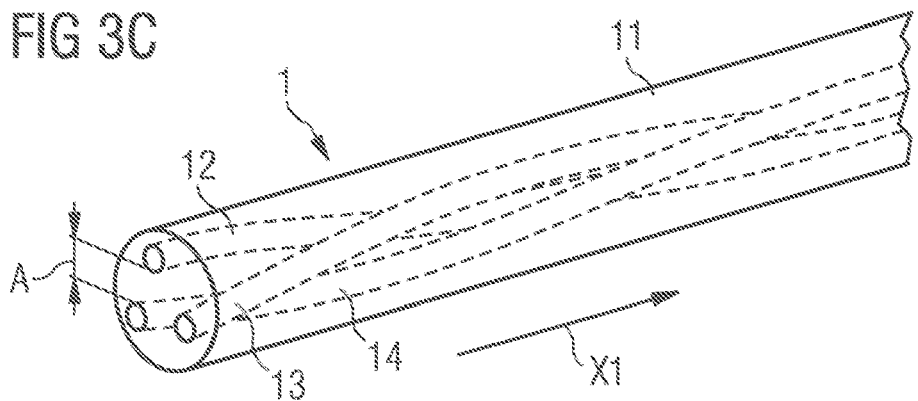

FIG. 3C shows schematic spatial representations of another exemplary embodiment of a light fiber 1, in which the cores 12, 13, 14 extend along the main extension direction X1 of the light fiber 1, wherein the cores 12, 13, 14 are helically twisted.

Starting from the incoupling surfaces 12a, 13a, 14a, the distance A decreases along the main extension direction X1 of the light fiber 1. In particular, the cores 12, 13, 14 may converge to a common core along the main extension direction X1 so that primary radiation coupled into the individual cores 12, 13, 14 is mixed in the common core.

Figure 3D:
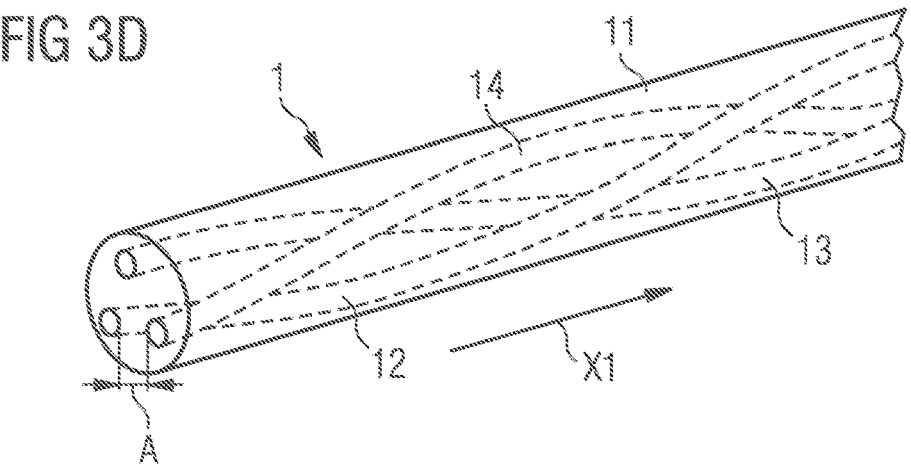

The FIG. 3D shows schematic spatial representations of another exemplary embodiment of a light fiber 1, in which the cores 12, 13, 14 are helically twisted along the main extension direction X1 of the light fiber 1. In contrast to the exemplary embodiment shown in FIG. 3C, the distance A of the cores 12, 13, 14 is constant along the main extension direction X1 of the light fiber 1.

Figure 4:
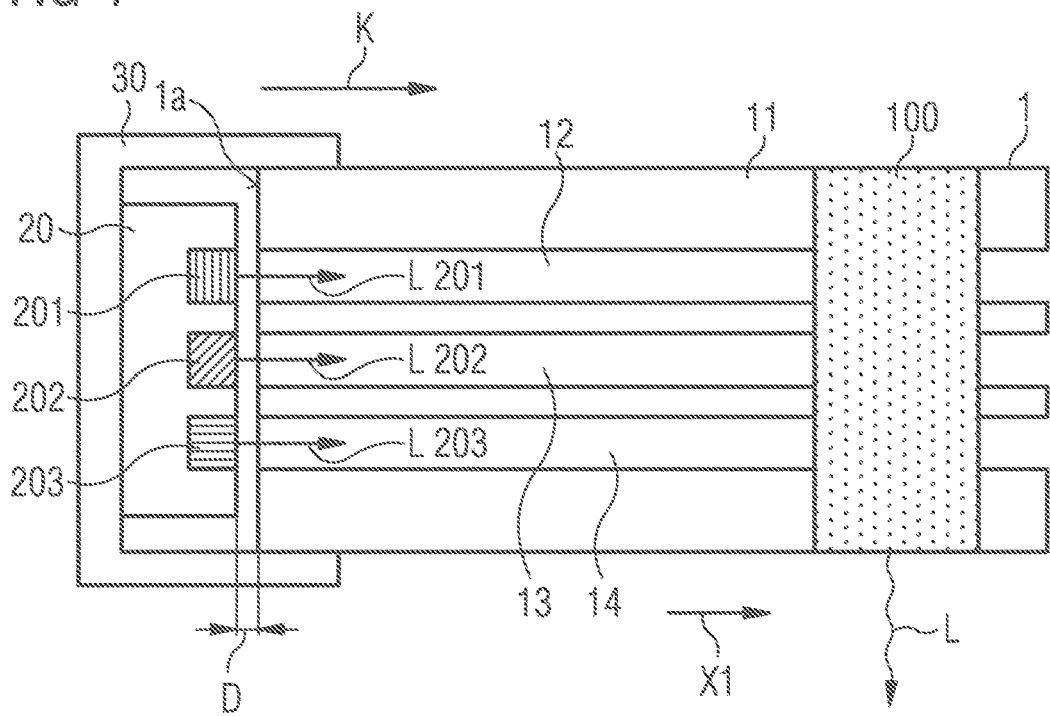
FIG. 4 shows a schematic sectional view of an exemplary embodiment of a illumination device.

FIG. 4 shows a schematic sectional view of an illumination device 2 according to an exemplary embodiment. The illumination device 2 comprises the light-emitting component 20 with three emission regions 201, 202, 203, a mount 30 and the light fiber 1. The mount 30 defines the relative position of the light fiber 1 to the light-emitting component 20. In particular, the light fiber 1 and the light-emitting component 20 are arranged in such a way that the emission regions 201, 202, 203 are each followed by one of the incoupling surfaces 12a, 13a, 14a of one of the cores 12, 13, 14 in the radiation direction K.

In normal operation, the emission regions 201, 202, 203 each emit primary radiation L201, L202, L203 with different wavelength ranges. The light fiber 1 is configured to mix the primary radiation L201, L202, L203. In the outcoupling zone the mixed primary radiation L201, L202, L203 from all emission regions 201, 202, 203 are emitted as mixed light L.

Between the emission regions 201, 202, 203 and the light fiber there is a gap which is filled with a transparent medium, for example air. Along the radiation direction K, the gap width D of the gap is 500 µm maximum.

FIG. 5A shows a schematic representation of a light-emitting component of an illumination device according to an exemplary embodiment. The light-emitting component 20 consists of three planar-contacted semiconductor chips 25, each forming an emission region 201, 202, 203. The semiconductor chips 25 are each electrically conductively contacted by a planar contact 210.

FIGS. 5B and 5C show a schematic sectional view of a light-emitting component 20 of an illumination device 2 according to alternative exemplary embodiments. The light-emitting devices 20 comprise three surface-mountable semiconductor chips 25, each forming an emission region 201, 202, 203. The semiconductor chips 25 are arranged on a common contact substrate 220 by which the semiconductor chips 25 are mechanically fixed and electrically conductively contacted.

In contrast to the exemplary embodiment shown in FIG. 5B, the embodiment shown in FIG. 5C additionally comprises a microcontroller 250. The microcontroller 250 is embedded in the contact substrate 220 and is configured to control the semiconductor chips 25.

Alternatively, the emission regions 201, 202, 203 may be part of a common semiconductor chip. For example, the light-emitting component 20 comprises a semiconductor chip 25 with several emission regions which can be operated separately from each other and which each emit primary radiation in different wavelength ranges.

The invention is not restricted to the exemplary embodiments by the description on the basis of said exemplary embodiments. Rather, the invention encompasses any new feature and also any combination of features, which in particular comprises any combination of features in the patent claims and any combination of features in the exemplary embodiments, even if this feature or this combination itself is not explicitly specified in the patent claims or exemplary embodiments.

The invention claimed is:
1. A light fiber comprising:
a cladding and a plurality of cores configured to conduct electromagnetic radiation; and
an outcoupling zone comprising at least one of the plurality of cores, the cladding, and an interface between the at least one of the plurality of cores and the cladding, wherein each one of the plurality of cores comprises an incoupling surface at one end of the light fiber,
wherein the incoupling surfaces of different cores of the plurality of cores are not contiguous,
wherein the outcoupling zone is distant from the incoupling surfaces,
wherein each one of the plurality of cores runs separately from all other cores of the plurality of cores from a respective incoupling surface to at least until the outcoupling zone,
wherein the outcoupling zone comprises scattering centers configured to outcouple the electromagnetic radiation from the plurality of cores,
wherein the light fiber is configured to emit at least a majority of the electromagnetic radiation in a region of the outcoupling zone transverse to a main extension direction of the light fiber,
and
wherein the outcoupling zone is configured to emit mixed electromagnetic radiation as mixed light from the light fiber.

2. The light fiber according to claim 1, wherein a cross-section perpendicular to the main extension direction of the light fiber is not rotationally symmetrical.

3. The light fiber according to claim 1, wherein the incoupling surfaces of the cores are each not formed rotationally symmetrical.

4. The light fiber according to claim 1, wherein the cores are helically twisted along the main extension direction of the light fiber.

5. The light fiber according to claim 1, wherein the incoupling surfaces are arranged at a distance from one another.

6. The light fiber according to claim 1, wherein the plurality of cores is configured to mix the electromagnetic radiation.

7. The light fiber according to claim 1, wherein the outcoupling zone of the cladding is configured to mix the electromagnetic radiation.

8. The light fiber according to claim 1, wherein the cores, the cladding and/or an interface between the cores and the cladding comprises the scattering centers.

9. The light fiber according to claim 8, wherein the scattering centers comprise scattering particles.

10. The light fiber according to claim 8, wherein the scattering centers comprise roughened surfaces.

11. The light fiber according to claim 1, wherein the cladding does at least partially not exist in the outcoupling zone.

12. An illumination device comprising:
a light-emitting component with at least two emission regions; and
the light fiber according to claim 1,
wherein one of the incoupling surfaces is arranged downstream of the emission regions in their respective radiation direction.

13. The illumination device according to claim 12, wherein the light-emitting component comprises a surface-mountable semiconductor chip or a planar-contacted semiconductor chip.

14. The illumination device according to claim 12,
wherein each incoupling surface comprises a first geometric center of gravity,
wherein each emission region comprises a second geometric center of gravity, and
wherein the second geometric centers of gravity are in each case aligned with one of the first geometric centers of gravity viewed along the radiation direction.

15. The illumination device according to claim 12,
wherein each emission region is configured to emit the electromagnetic radiation with different wavelength ranges, and
wherein the outcoupling zone is configured to emit the mixed light comprising the electromagnetic radiation from all emission regions.

* * * * *